(12) United States Patent
Asao et al.

(10) Patent No.: US 7,768,162 B2
(45) Date of Patent: Aug. 3, 2010

(54) DYNAMOELECTRIC COIL PORTION INSULATING CONSTRUCTION

(75) Inventors: Yoshihito Asao, Tokyo (JP); Hiroki Katayama, Tokyo (JP); Hitoshi Tokuyama, Sanda (JP); Tomotaka Makino, Sanda (JP)

(73) Assignees: Mitsubishi Electric Corporation, Tokyo (JP); Ryodin Kasei Co., Ltd., Hyogo (JP)

( * ) Notice: Subject to any disclaimer, the term of this patent is extended or adjusted under 35 U.S.C. 154(b) by 388 days.

(21) Appl. No.: 11/847,767

(22) Filed: Aug. 30, 2007

(65) Prior Publication Data

US 2008/0246354 A1    Oct. 9, 2008

(30) Foreign Application Priority Data

Apr. 5, 2007    (JP) .............................. 2007-099459

(51) Int. Cl.
*H02K 15/22* (2006.01)
(52) U.S. Cl. ....................................................... 310/45
(58) Field of Classification Search .................. 310/45, 310/252, 43
See application file for complete search history.

(56) References Cited

U.S. PATENT DOCUMENTS

| | | | | | |
|---|---|---|---|---|---|
| 5,536,791 | A | * | 7/1996 | Schink et al. | ................ 525/417 |
| 5,854,334 | A | * | 12/1998 | Schink et al. | ................ 524/539 |
| 6,051,906 | A | * | 4/2000 | Umeda et al. | ................ 310/179 |
| 2003/0020338 | A1 | * | 1/2003 | Hirsou et al. | .................. 310/52 |

FOREIGN PATENT DOCUMENTS

| | | |
|---|---|---|
| CN | 1745510 A | 3/2006 |
| JP | 5-130759 A | 5/1993 |
| JP | 2005302598 A | 10/2005 |
| JP | 2005304223 A | 10/2005 |
| JP | 2005-328584 A | 11/2005 |
| JP | 2006187059 A | 7/2006 |
| WO | 2004098028 A1 | 11/2004 |
| WO | 2005075586 A1 | 8/2005 |

* cited by examiner

*Primary Examiner*—Nguyen N Hanh
(74) *Attorney, Agent, or Firm*—Sughrue Mion, PLLC

(57) ABSTRACT

A stator coil 24 is installed in a stator core 11, and an insulating resin is impregnated into slot portions 22 and hardened. The stator coil 24 is constituted by enameled wires in which a polyamideimide resin layer has been applied radially outside a copper wire and hardened, and the insulating resin contains as a major component a THEIC-modified polyester resin that has been modified by a fatty acid.

12 Claims, 14 Drawing Sheets

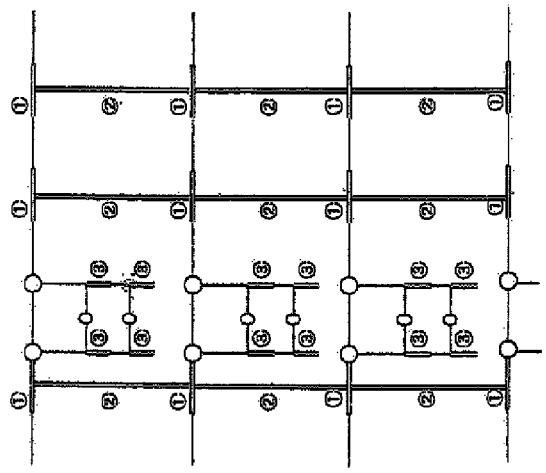
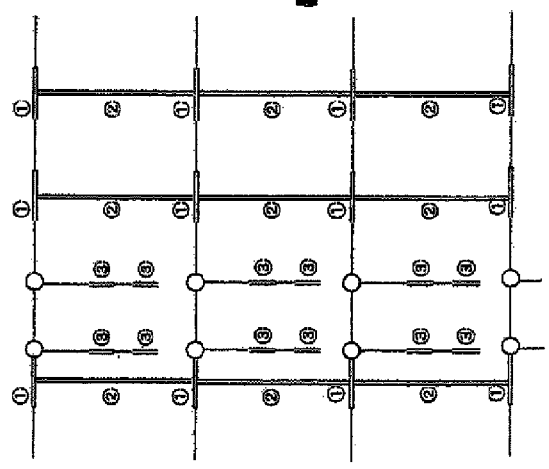
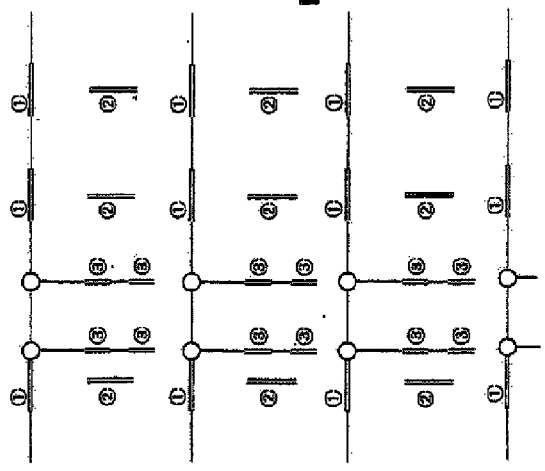
FIG. 6A [Liquid state]
FIG. 6B [Solid state after heat hardening]
FIG. 6C [Slow cross-linking due to heat history]
① Double bonds of unsaturated polyester polymer chains (double bonds derived from unsaturated acids)
② Reactive diluent
③ Double bonds of oil component

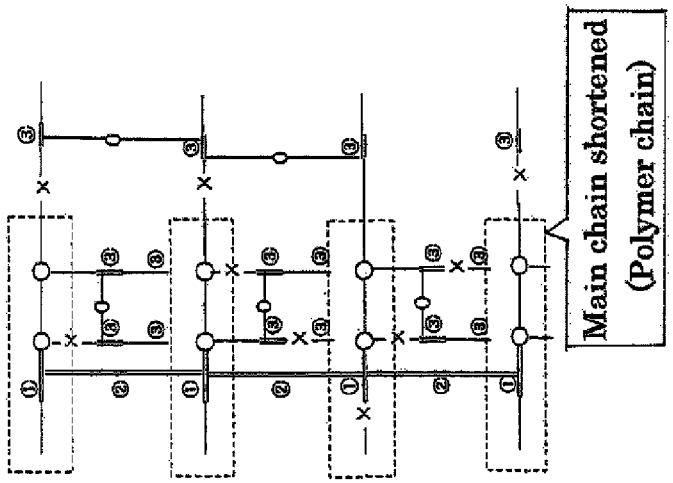
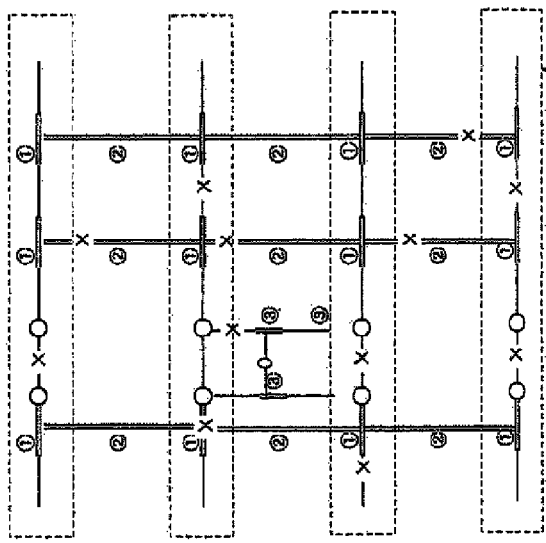
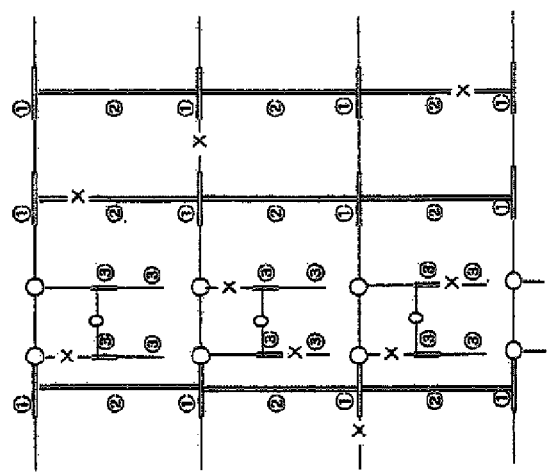

DYNAMOELECTRIC COIL PORTION INSULATING CONSTRUCTION

BACKGROUND OF THE INVENTION

1. Field of the Invention

The present invention relates to a coil portion insulating construction for a dynamoelectric machine such as an automotive alternator, etc., and particularly relates to an insulating construction for a stator coil, or a field coil, etc.

2. Description of the Related Art

In conventional automotive alternators, coil portions that are formed by winding enameled wire onto a stator core, or a rotor core, etc., have been impregnated with insulating resins such as unsaturated polyester resins, or polyester resins to which epoxy resins have been added, etc., to increase insulation of the coil portions.

Coil portion insulating constructions in which enameled wires that have enamel coatings that have polyamideimide resin layers were used and epoxy-modified polyesterimide resins were used as insulating resins have been disclosed, such as in Patent Literature 1, for example.

[Patent Literature 1]

Japanese Patent Laid-Open No. 2005-328584 (Gazette)

Since automotive alternators of this kind are exposed to high temperatures and vibrations for long periods, not only initial adhesive strength is required of the insulating resin of the coil portion insulating construction, but also adhesive strength that is high for long periods. For insulating resins that are applied to and impregnated into coil portions that are formed by winding enameled wires onto stator cores, or rotor cores, etc., in particular, not only high adhesive strength is required but also increased insulation. Thus, one problem has been that the service life of enamel coatings may be affected if compatibility between the enamel coatings and the insulating resins is poor, giving rise to early insulation failure.

Because automotive alternators are mass-produced, high productivity is also required. Because the enameled wires are bent and deformed in the process of winding the enameled wires, large mechanical loads act on the enameled wires, imparting damage to the enamel coatings. It is necessary to select the insulating resins that are applied and impregnated in subsequent steps so as not to have adverse effects that might damage the enamel coatings.

Since the epoxy-modified polyesterimide resin that is disclosed in Patent Literature 1 has extremely rigid properties, large shearing stresses may arise between the insulating resin and the enamel coatings if the epoxy-modified polyesterimide resin is used as the insulating resin, imparting damage to the enamel coatings and reducing the service life of the enamel coatings.

SUMMARY OF THE INVENTION

The present invention aims to solve the above problems and an object of the present invention is to provide a dynamoelectric coil portion insulating construction in which stresses that arise between conductors and an insulating resin are alleviated to reduce damage to enamel coatings and also to maintain high adhesive strength and increased insulation over a long period.

In order to achieve the above object, according to one aspect of the present invention, there is provided a dynamoelectric coil portion insulating construction for a dynamoelectric machine in which a coil portion that is formed by winding a coil onto a core is impregnated with an insulating resin, the dynamoelectric coil portion insulating construction being characterized in that: the coil is an enameled wire that is covered by an enamel coating in which an uppermost layer is a polyamideimide resin layer; and the insulating resin is a THEIC-modified polyester resin that has been modified by an oil component.

According to the present invention, the uppermost layer of the enamel coating of the enameled wire is a soft polyamideimide resin layer that has high heat resistance, and the THEIC-modified polyester resin, which constitutes a major component of the insulating resin and which has high heat resistance, is modified by the oil component, reducing the hardness of the insulating resin. Thus, stresses that arise between the conductor of the enameled wire and the insulating resin are alleviated, reducing damage to the enamel coating.

It is particularly necessary for dynamoelectric machines such as automotive alternators, etc., that are mounted to vehicles to endure use for long periods such as 15 years, 150,000 km, etc., for example, and coil portion insulating constructions that can be used therein are required not only to have strong initial adhesive forces but also to maintain strong adhesive forces over long periods. In a coil portion insulating construction according to the present invention, because the THEIC-modified polyester resin that constitutes a major component of the insulating resin 26 is modified by the oil component, reactions in the insulating resin are slowed down, and strong adhesive forces and increased insulation can be maintained not only when new, but also for long periods, making the present invention eminently suitable for coil portion insulating constructions in dynamoelectric machines that are mounted to vehicles.

BRIEF DESCRIPTION OF THE DRAWINGS

FIGS. 6A through 6C are diagrams that explain a thermal degrading action of the insulating resin that can be used in the insulating construction according to Embodiment 1 of the present invention;

FIGS. 9A through 9C are diagrams that explain thermally degraded states after the heat hardening of the insulating resin that can be used in the insulating construction according to Embodiment 1 of the present invention;

DETAILED DESCRIPTION OF THE PREFERRED EMBODIMENTS

Embodiment 1

Figure 1:
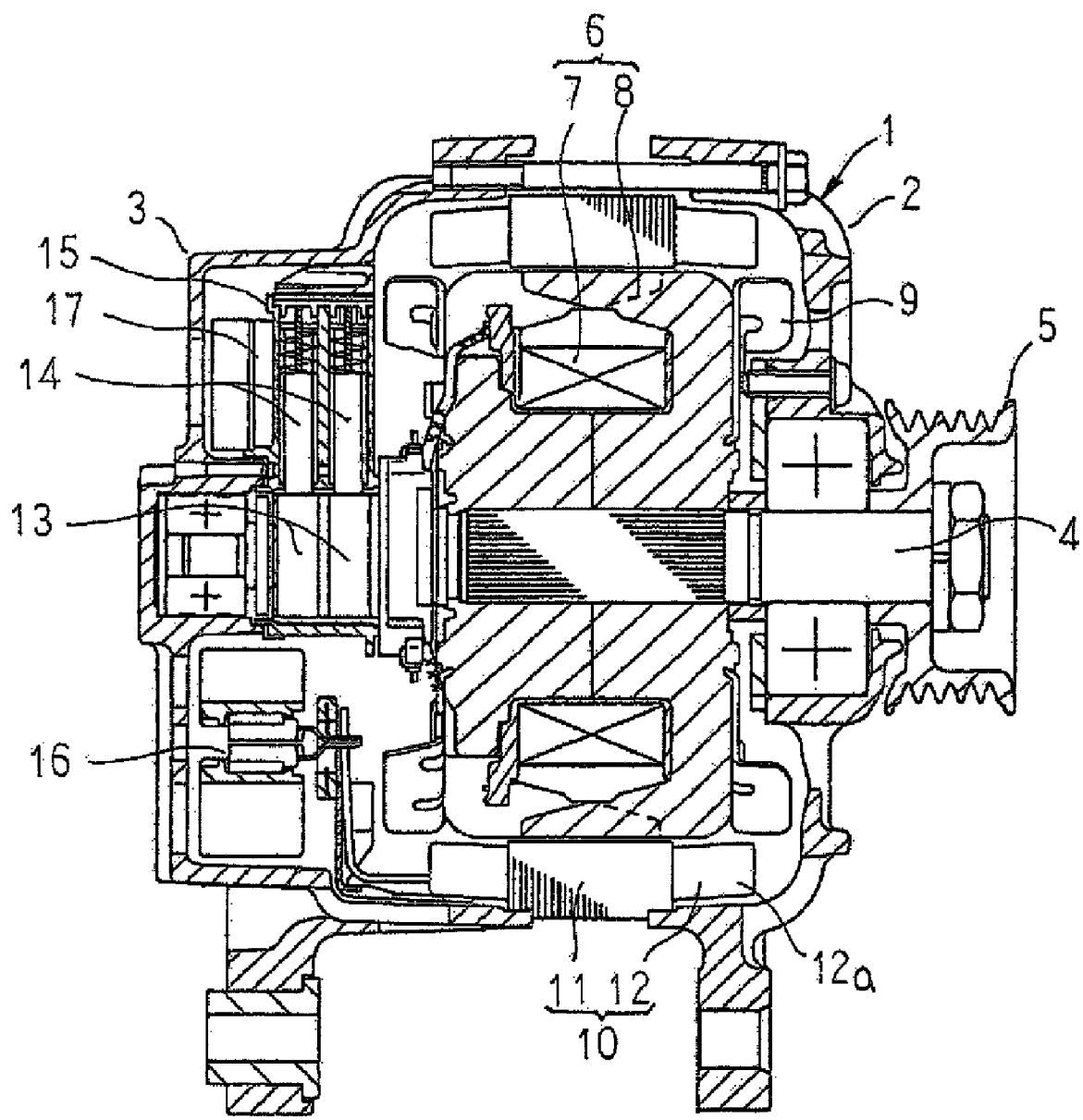
FIG. 1 is a cross section of an automotive alternator to which an insulating construction according to Embodiment 1 of the present invention has been applied.
Figure 2:
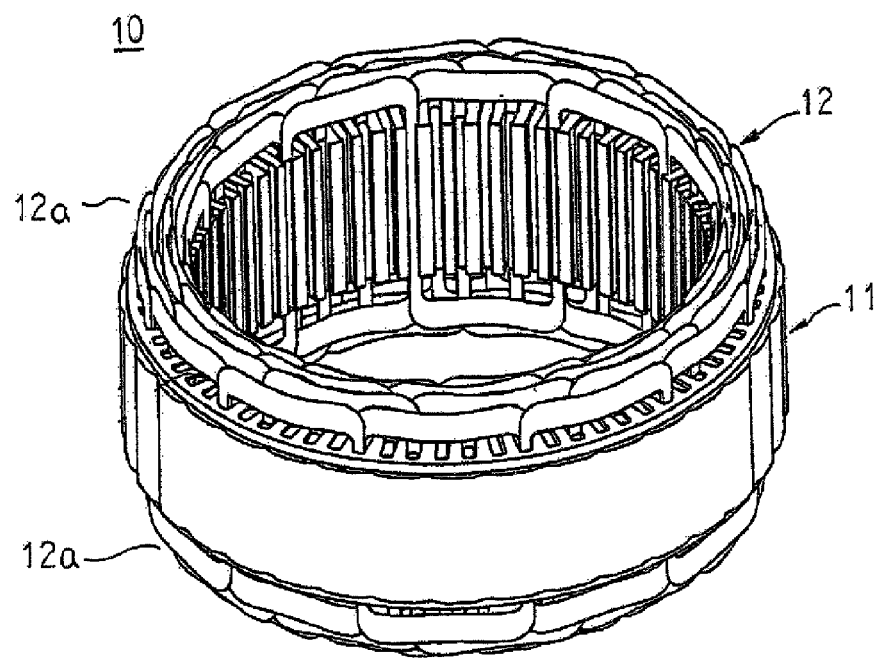
FIG. 2 is a perspective of a stator to which the insulating construction according to Embodiment 1 of the present invention has been applied.
Figure 3:
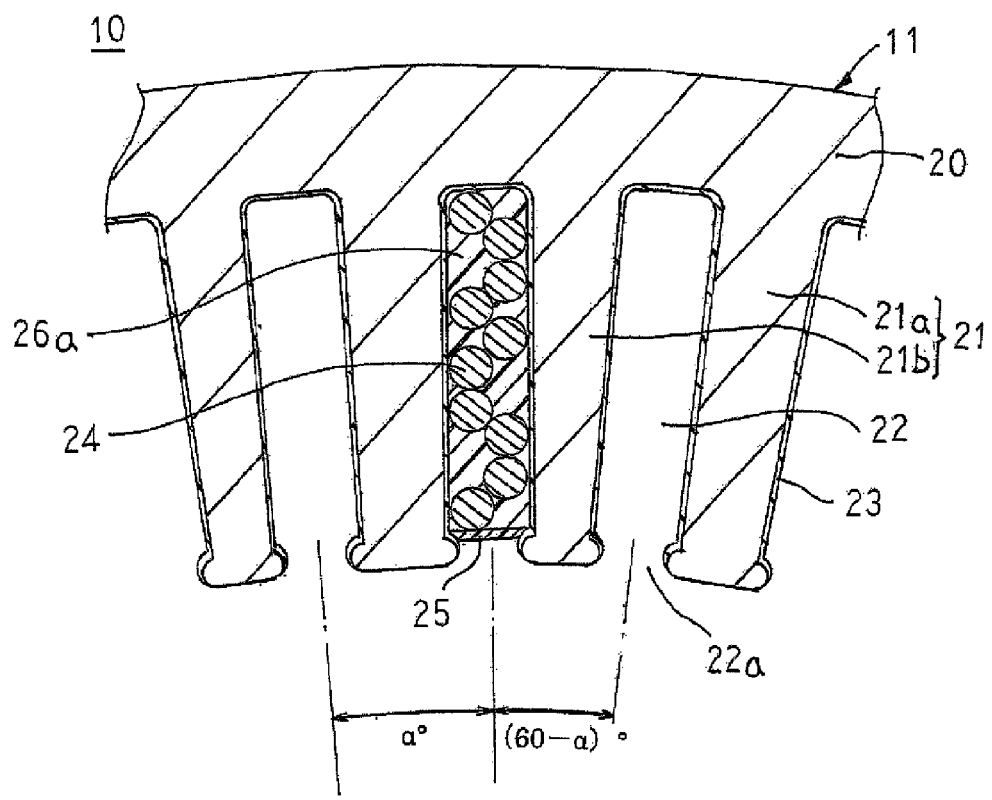
FIG. 3 is a partial cross section of the stator that is shown in FIG. 2.
Figure 4:
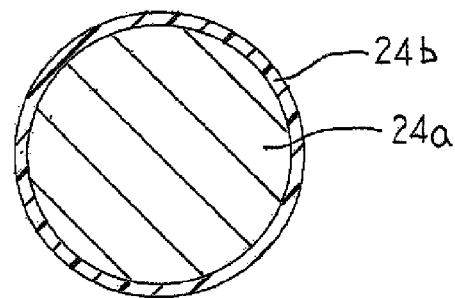
FIG. 4 is a cross section of a stator coil that constitutes a stator winding of the stator that is shown in FIG. 2.
Figure 5:
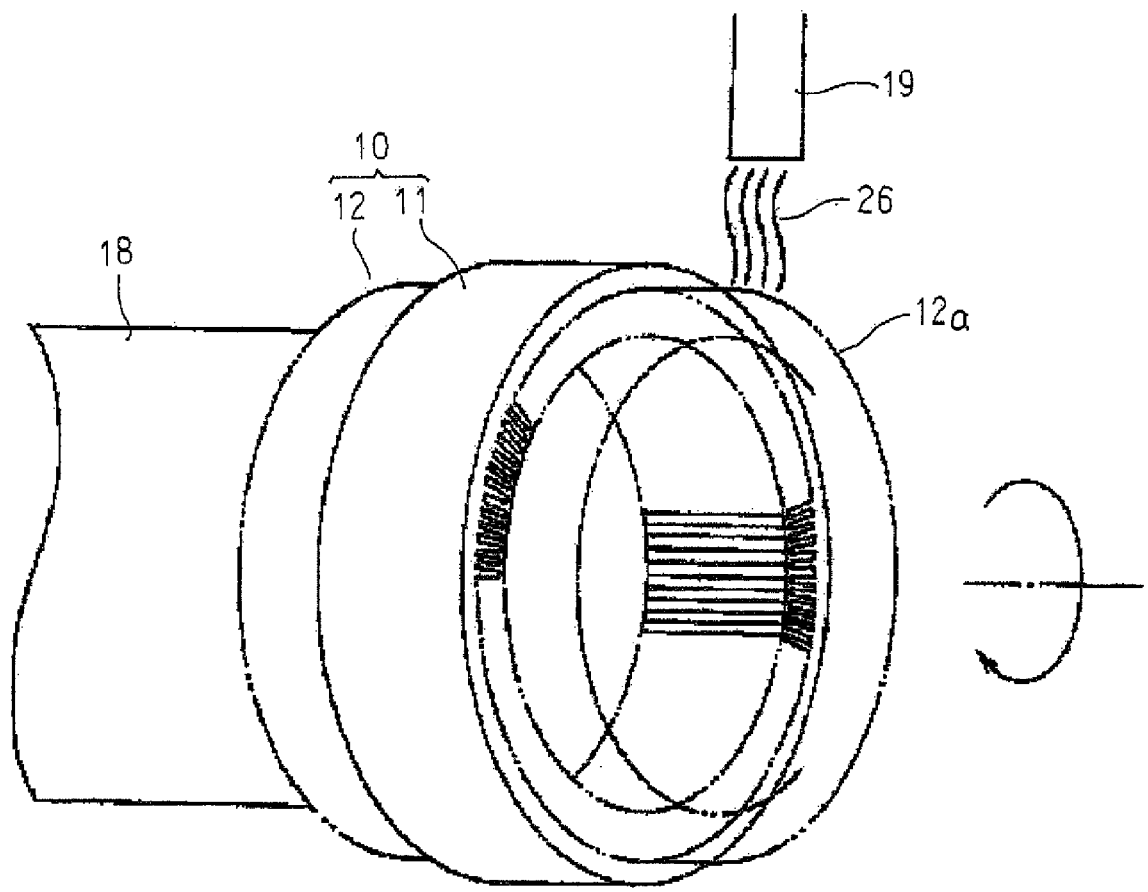
FIG. 5 is a diagram that explains a step of applying an insulating resin to the stator that is shown in FIG. 2.
Figure 7:
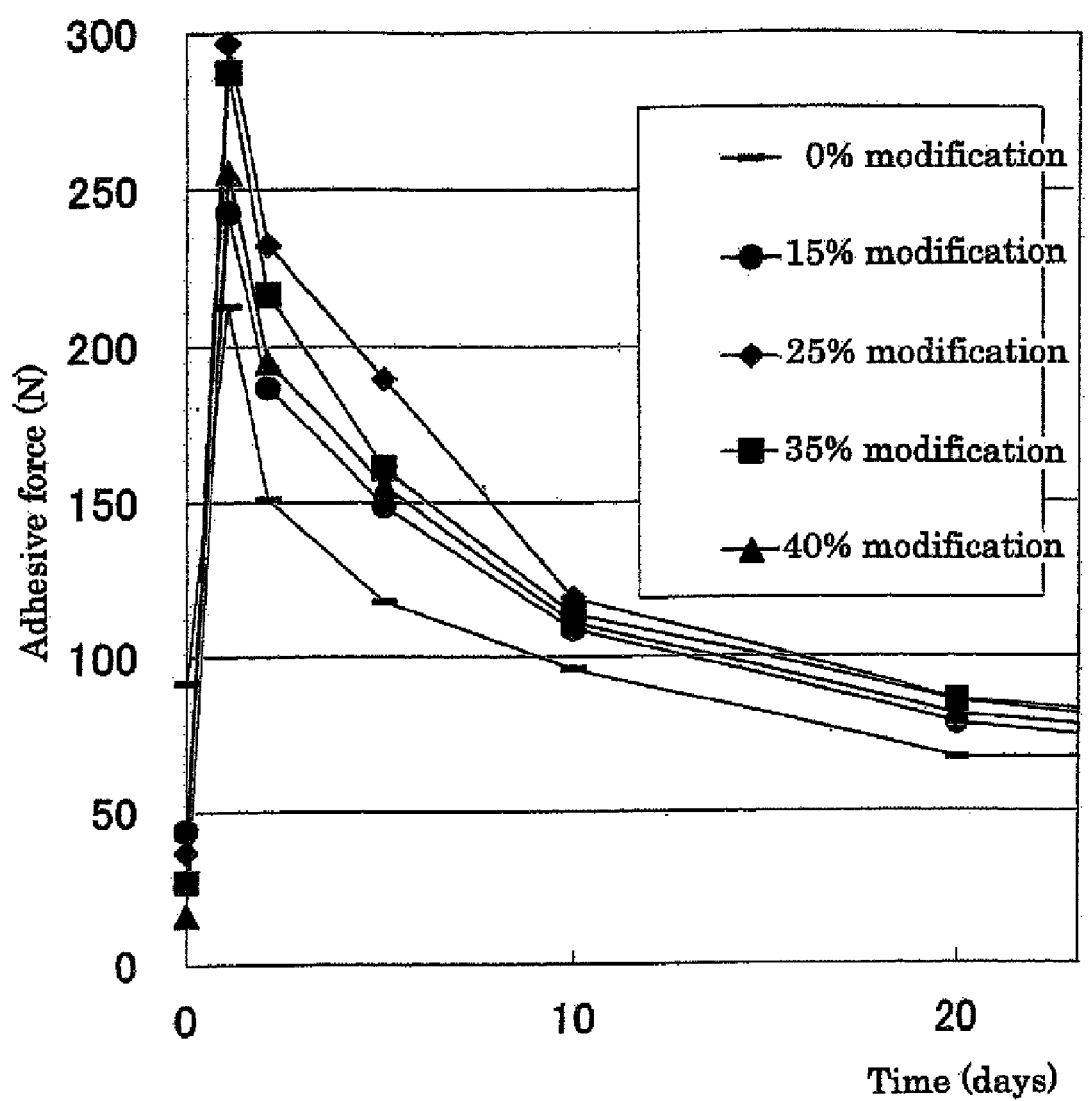
FIG. 7 is a graph that shows changes in adhesive force after heat hardening of the insulating resin that can be used in the insulating construction according to Embodiment 1 of the present invention.
Figure 8:
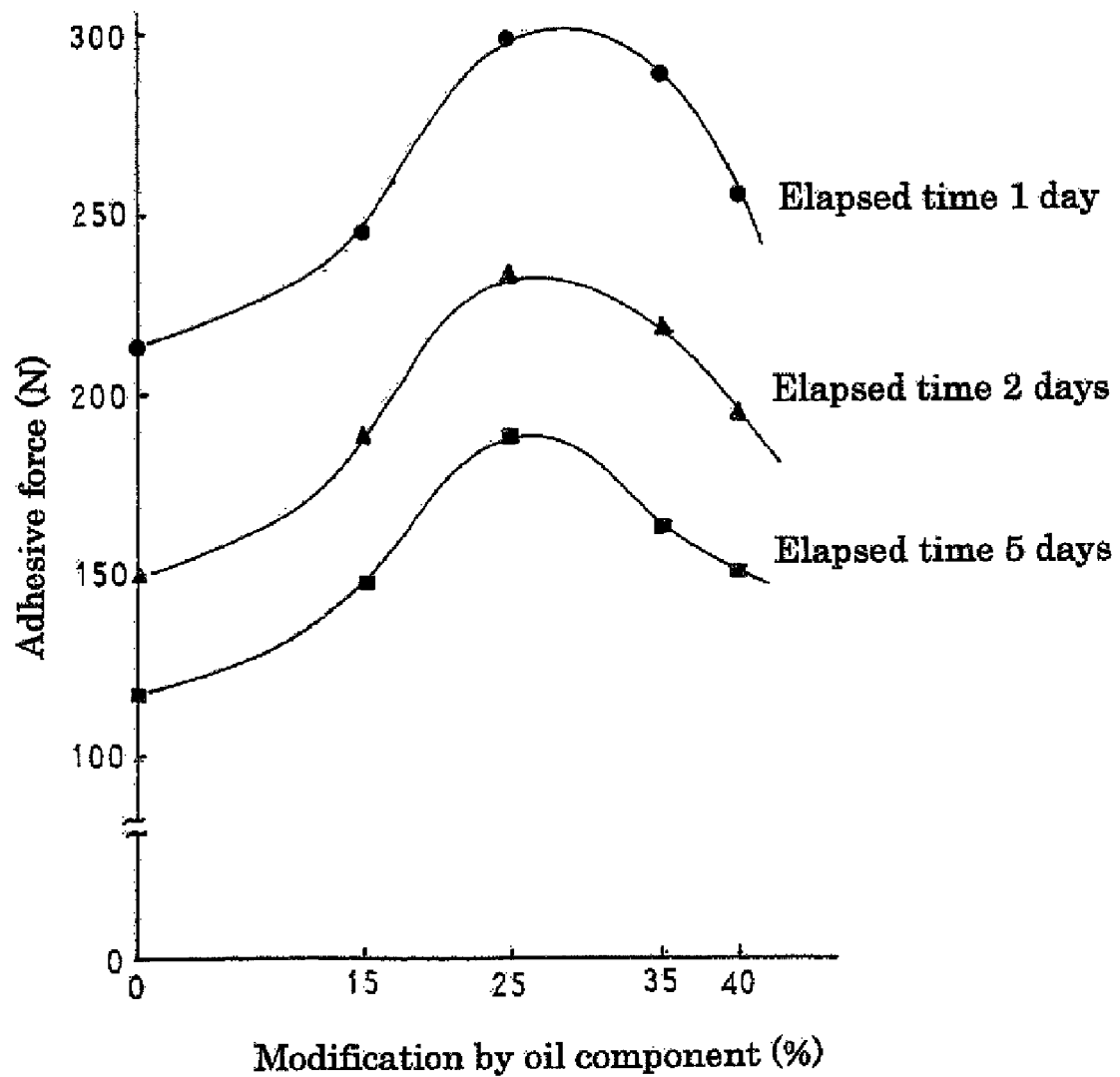
FIG. 8 is a graph that shows relationships between adhesive force and modification by an oil constituent after the heat hardening of the insulating resin that can be used in the insulating construction according to Embodiment 1 of the present invention.

FIG. 1 is a cross section of an automotive alternator to which an insulating construction according to Embodiment 1 of the present invention has been applied, FIG. 2 is a perspective of a stator to which the insulating construction according to Embodiment 1 of the present invention has been applied, FIG. 3 is a partial cross section of the stator that is shown in FIG. 2, FIG. 4 is a cross section of a stator coil that constitutes a stator winding of the stator that is shown in FIG. 2, and FIG. 5 is a diagram that explains a step of applying an insulating resin to the stator that is shown in FIG. 2. FIGS. 6A through 6C are diagrams that explain a thermal degrading action of the insulating resin that can be used in the insulating construction according to Embodiment 1 of the present invention, FIG. 6A representing a liquid state of the insulating resin, FIG. 6B representing a solid state after heat hardening of the insulating resin, and FIG. 6C representing a loosely cross-linked state that results from heat history after the heat hardening of the insulating resin. FIG. 7 is a graph that shows changes in adhesive force after heat hardening of the insulating resin that can be used in the insulating construction according to Embodiment 1 of the present invention, FIG. 8 is a graph that shows relationships between adhesive force and modification by an oil constituent after the heat hardening of the insulating resin that can be used in the insulating construction according to Embodiment 1 of the present invention, FIGS. 9A through 9C are diagrams that explain thermally degraded states after the heat hardening of the insulating resin that can be used in the insulating construction according to Embodiment 1 of the present invention, FIG. 9A representing a thermally degraded state of the insulating resin after heat hardening when modification by an oil component was 20 to 40 percent, FIG. 9B representing a thermally degraded state of the insulating resin after heat hardening when modification by the oil component was ten percent or less, and FIG. 9B representing a thermally degraded state of the insulating resin after heat hardening when modification by the oil component was 40 percent or more.

In FIG. 1, an automotive alternator that functions as a dynamoelectric machine includes: a case 1 that is constituted by a front bracket 2 and a rear bracket 3 that are each approximately bowl-shaped and made of aluminum; a shaft 4 that is rotatably supported at a central axial position of the case 1; a pulley 5 that is fixed to an end portion of the shaft 4 that projects outward at a front end of the case 1; a rotor 6 that is fixed to the shaft 4 so as to be accommodated inside the case 1; fans 9 that are fixed to two axial end surfaces of the rotor 6; a stator 10 that is fixed to an inner wall surface of the case 1 so as to surround an outer circumference of the rotor 6; slip rings 13 that are fixed to a rear end of the shaft 4 so as to supply electric current to the rotor 6; a pair of brushes 14 that are disposed inside the case 1 so as to slide on the slip rings 13; a brush holder 15 that houses the brushes 14; a rectifier 16 that is electrically connected to the stator 10 so as to rectify alternating current that is generated in the stator 10 into direct current; and a regulator 17 that adjusts magnitude of alternating voltage that is generated in the stator 10.

The rotor 6 is constituted by: a field coil 7 that generates magnetic flux on passage of electric current; and a pole core 8 that constitutes a rotor core that is disposed so as to cover the field coil 7 and in which magnetic poles are formed by the magnetic flux. The stator 10 includes: a cylindrical stator core 11; and a stator winding 12 that is wound onto the stator core 11 and in which alternating current arises due to changes in the magnetic flux from the field coil 7 that accompany rotation of the rotor 6.

Next, a specific construction of the stator 10 will be explained with reference to FIGS. 2 and 3.

The stator core 11 includes: an annular core back portion 20; a plurality of tooth portions 21 that are disposed so as to extend radially inward from the core back portion 20; and a plurality of slot portions 22 that are defined by the core back portion 20 and the tooth portions 21. The tooth portions 21 are constituted by tooth portions 21a that have a large circumferential width and narrow tooth portions 21b. The tooth portions 21a and 21b are disposed alternately such that an electrical angle between center lines of slot opening portions 22a of adjacent slot portions 22 (lines that connect circumferential centers and a central axis) alternates between α° and (60−α)°. Moreover, α does not equal 30. The slot portions 22 are prepared at a ratio of two slots per phase per pole at a nonuniform pitch. Insulating coatings 23 are fixed so as to cover inner surfaces of the slot portions 22. These insulating coatings 23, are formed, for example, by applying and hardening a resin such as an epoxy resin, etc., on the inner surfaces of the slot portions 22.

The stator winding 12 includes six phase windings that are installed in every sixth slot portion 22, and is constituted by: a first alternating-current winding in which three phase windings that are installed so as to have a phase difference of 120 electrical degrees are formed into an alternating-current connection; and a second alternating-current winding in which three remaining phase windings that are installed so as to have a phase difference of 120 electrical degrees are formed into an alternating-current connection. Here, the first alternating-current winding and the second alternating-current winding have a phase difference of a electrical degrees. Each of the phase windings is constituted by two 5-turn distributed windings that are connected in parallel. Ten slot-housed portions of the stator coil 24 are housed in each of the slot portions 22. Wedges 25 are mounted so as to block the slot opening portions 22a, and an insulating resin 26 is impregnated into the slot portions 22 and hardened. Coil ends that link the slot-housed portions of the stator coil 24 to each other extend outward at two axial ends of the stator core 11 so as to constitute coil end groups 12a of the stator winding 12. The insulating resin 26 is applied to the two coil end groups 12a, impregnated, and hardened.

As shown in FIG. 4, the stator coil 24 is constituted by enameled wires that are constituted by: a copper wire 24a that functions as a conductor that has a diameter of 1.1 mm; and a polyamideimide resin layer 24b that functions as an enamel coating that is applied externally around the copper wire 24a to a thickness of approximately 30 μm and hardened. The polyamideimide resin layer 24b can generally withstand temperatures that are greater than or equal to 220 degrees Celsius, and also has high mechanical strength and superior extensibility and can withstand shaping loads that act on the stator coil 24 so as to suppress the occurrence of damage to the polyamideimide resin layer 24b during winding processes.

The insulating resin 26 is a compound that has a base resin in which a tris-hydroxyethyl isocyanurate (THEIC)-modified polyester resin has been modified 35 percent by a fatty acid of a vegetable oil that includes a double bond and that functions as an oil component, to which 2-hydroxyethyl methacrylate (HEMA) that constitutes an acrylic monomer that functions as a reactive diluent has been added and dissolved such that the base resin solid component is 40 to 50 weight percent, and to which 0.04 weight percent of a polymerization inhibitor (hydroquinone), 0.1 weight percent of a desiccant (cobalt naphthenate), and 1.3 weight percent of a peroxide (1,1-di-(tert-butylperoxy) cyclohexane) have been added.

As shown in FIG. 5, the stator core 11 is held in a holding jig 18 and is rotated around a central axis while the insulating resin 26 is applied from a nozzle 19 from radially outside the stator 10 and impregnated into the coil end groups 12a of the stator winding 12 then hardened by heating it to 150 degrees Celsius for thirty minutes. The insulating resin 26 is thereby impregnated into and hardened in the coil end groups 12a, and the large number of coil ends that constitute the coil end groups 12a are fixed integrally by a hardened body 26a of the insulating resin 26. Similarly, the insulating resin 26 that has been applied to the coil end groups 12a passes over the coil ends and is impregnated into the slot portions 22 and hardened, and the slot-housed portions of the stator coil 24 are fixed to the slot portions 22 by the hardened body 26a of the insulating resin 26. Rigidity of the stator 10 is thereby increased, suppressing the occurrence of electromagnetic noise, and vibration resistance of the stator winding 12 is also increased, suppressing deterioration of insulation that results from abrasion of the stator coil 24.

Because the hardened body 26a of the insulating resin 26 contains the THEIC-modified polyester resin as a major component, it has high heat resistance, but is generally hard, and imparts significant damage to the enamel coatings under high thermal loads. In Embodiment 1, the THEIC-modified polyester resin is modified by the oil component, reducing the hardness of the hardened body 26a of the insulating resin 26. In addition, a soft polyamideimide resin layer 24b is used for the enamel coating. Thus, stresses that arise between the copper wire 24a of the stator coil 24 and the hardened body 26a of the insulating resin 26 are alleviated, reducing damage to the polyamideimide resin layer 24b that constitutes the enamel coating. Because the THEIC-modified polyester resin that constitutes a major component of the insulating resin 26 is modified by the oil component, strong adhesive forces and good insulation can be maintained not only when new, but also for long periods, as described below.

Next, the effects of modification of the THEIC-modified polyester resin that constitutes a major component of the insulating resin 26 by the oil component will be explained with reference to FIGS. 6A through 6C.

In normal hardening processes of the insulating resin 26, only cross-linking due to radical polymerization of the double bonds of the unsaturated polyester resin and the double bonds of the reactive diluent occurs during hardening, as shown in FIG. 6A.

At this time, cross-linking of the double bonds in the fatty acids has not occurred, and fatty acids that have bonded like pendants from the polymer chains are present in the hardened body 26a, as shown in FIG. 6B. The presence of these fatty acid imparts ductility to the hardened body 26a, alleviating stresses due to linear expansion differences between the hardened body 26a of the insulating resin 26 and the polyamideimide resin layer 24b.

In addition, as shown in FIG. 6C, loose cross-linking that results from oxygen polymerization of the double bonds in the fatty acids occurs due to the heat history that the automotive alternator is subjected to during use, slowly increasing the strength of the hardened body 26a of the insulating resin 26. The strength continues rising until this loose cross-linking is completed, and during that time thermal degradation is prevented. As the cross-linking progresses, the strength of the hardened body 26a of the insulating resin 26 is increased, but because the progression of the cross-linking is slow, stresses that are generated at the polyamideimide resin layer 24b are slight, compatibility between the hardened body 26a of the insulating resin 26 and the polyamideimide resin layer 24b remains good, and damage to the polyamideimide resin layer 24b is reduced, maintaining good insulation.

Next, the relationship between adhesive force of the hardened body 26a of the insulating resin 26 relative to the stator coil 24 and modification by the oil component (the fatty acids) will be explained. Here, the above-mentioned adhesive force was measured using a helical adhesive force test. In this helical adhesive force test, the stator coil 24 (the enameled wire) was wound up in a helical shape, and the insulating resin 26 was applied and hardened under conditions that are stipulated in Japanese Industrial Standards (JIS) C3003, then two ends of test pieces were supported and breaking force at a central portion of the helical coil was measured. This breaking force was assumed to be the adhesive force. The breaking force was measured after hardening of the insulating resin 26 (initial), and also after the test pieces had been left for a predetermined amount of time at an ambient temperature of 260 degrees Celsius, and the results are shown in FIGS. 7 and 8.

From FIGS. 7 and 8, it can be seen that the greater the amount of modification by the oil component, the smaller the initial adhesive force. It can also be seen that the maximum adhesive force that is reached increases gradually as modification by the oil component is increased, increases rapidly when modification is in a vicinity of 15 percent, increases gradually when modification exceeds 20 percent, is maximal when modification is in a vicinity of 25 percent, decreases gradually when modification exceeds the vicinity of 25 percent, and decreases rapidly when modification exceeds 40 percent.

It can further be seen that the adhesive force decreases gradually after it has reached the maximum value. It can also be inferred from this that breakage of molecular chains occurs due to thermal load, and as time passes the number of breakage points increases and damage to the main chains increases, reducing adhesive force, in other words, thermal degradation occurs. Moreover, let us designate being less likely to degrade thermally as "thermal degradation resistance".

Now, as shown in FIG. 9B, if modification by the oil component is less than or equal to 15 percent, the rate of change in the percentage of the number of breakage points in the molecular chains relative to the overall number of cross-links is increased because there are few cross-links in the oil component. Consequently, it can be inferred that the percentage of the number of breakage points in the molecular chains relative to the overall number of cross-links increases as thermal degradation progresses, and that adhesive force is greatly reduced, in other words, that thermal degradation resistance is reduced.

As shown in FIG. 9C, if modification by the oil component is greater than or equal to 40 percent, the initial adhesive force is reduced and the rate of change in the percentage of the number of breakage points in the molecular chains relative to the overall number of cross-links is also increased because the main chains are short and there are few cross-links. Consequently, it can be inferred that the percentage of the number of breakage points in the molecular chains relative to the overall number of cross-links increases as thermal degradation progresses, and that adhesive force is greatly reduced, in other words, that thermal degradation resistance is reduced.

On the other hand, the rate of change in the percentage of the number of breakage points in the molecular chains relative to the overall number of cross-links is reduced if modification by the oil component is greater than or equal to 20 percent and less than 40 percent, as shown in FIG. 9A, because there are more cross-links in the oil component. Consequently, the percentage of the number of breakage points in the molecular chains relative to the overall number of cross-links is small even if thermal degradation progresses, reducing decreases in adhesive force, and it can be inferred that adhesive force is maintained, in other words, that superior thermal degradation resistance is achieved.

Consequently, in order to maintain large adhesive forces over a long period, in other words, to achieve superior thermal degradation resistance over a long period, it is desirable to set modification of the THEIC-modified polyester resin by the oil component to a range from greater than or equal to 20 percent to less than 40 percent.

In Embodiment 1, because modification of the THEIC-modified polyester resin that constitutes a major component of the insulating resin 26 by the oil component is set to 35 percent, viscosity of the insulating resin 26 is lowered, increasing the impregnation of the insulating resin 26 inside the coil end groups 12a and the slot portions 22. Thus, the insulating resin 26 impregnates the coil end groups 12a without leaving gaps, and also impregnates inside the slot portions 22 in which the ten slot-housed portions of the stator coil 24 are housed in a non-aligned state without leaving gaps. Because the coil ends of the coil end groups 12a are thereby fixed firmly to each other, and the slot-housed portions are fixed firmly to the stator core 11, rigidity of the stator 10 is increased, and superior vibration resistance is achieved.

HEMA, which is an acrylic monomer, is used in the reactive diluent. Since HEMA is odorless, is not very volatile, and is stable, it is eco-friendly, unlike volatile diluents such as styrenes, etc. HEMA also dissolves the oil component of the insulating resin 26 well, improving wetting with the polyamideimide resin layer 24b. Because the reactivity of HEMA with the double bonds that are derived from the unsaturated acids of the unsaturated polyester resin is also lower than conventional styrene monomers, etc., the hardening reaction is further slowed down, achieving flexible characteristics and also making thermal degradation less likely.

Thus, by using the acrylic monomer HEMA in the reactive diluent, improved environmental characteristics can be achieved, and compatibility can also be maintained between the enamel coating of the stator coil 24 and the insulating resin 26, achieving superior insulation and thermal degradation resistance.

Next, thermal endurance tests were performed on automotive alternators in which stators 10 to which the present insulating construction was applied were installed, and the results are shown in Table 1. Moreover, the comparative examples were automotive alternators in which stators were installed that were prepared using an epoxy resin-mixed polyester resin as the insulating resin.

In these thermal endurance tests, the automotive alternators were operated for a long time under the following conditions and the time until power generation failure was measured:
alternator rotational speed: 3,000 rpm (constant)
ambient temperature: 120 degrees Celsius
electric load and time: repetition between battery load (generated output approximately 5 A) for 30 min and maximum load (generated output approximately 70 A) for 30 min.

TABLE 1

| | Sample | Insulating resin | Test time | Test result |
| --- | --- | --- | --- | --- |
| Conventional | No. 1<br>No. 2 | Epoxy resin-mixed polyester resin | 754 Hr<br>776 Hr | Decrease in generated current due to shorting in stator coil |
| Present invention | No. 3<br>No. 4 | THEIC-modified polyester resin modified 35 percent by fatty acids | 1802 Hr<br>2441 Hr | Decrease in generated current due to shorting in stator coil |

Power generation failure is due to a decrease in generated current that is due to shorting in the stator coil that results from the deterioration of the enamel coatings and can be used to compare the insulation (of the enameled wires) in the stator coil.

From Table 1, it has been confirmed that a superior insulating construction can be achieved by using the present insulating resin 26, and that a service life that is 2.4 times to 3.2 times that of the comparative example can be achieved.

It is necessary for automotive alternators to endure use for long periods such as 15 years, 150,000 km, etc., for example, and coil portion insulating constructions in stators that can be used therein are required not only to have strong initial adhesive forces but also to maintain strong adhesive forces over long periods. The coil portion insulating construction according to Embodiment 1 can maintain such strong adhesive forces and superior insulation over long periods, making it eminently suitable for coil portion insulating constructions in automotive alternator stators.

Moreover, in Embodiment 1 above, fatty acids that have double bonds are used for the oil component, but the oil component is not limited to fatty acids provided that it has double bonds, and organic acids that have carbon chains that have double bonds such as dodecenyl succinic anhydride, etc., can be used, for example.

Embodiment 2

In Embodiment 1 above, a coil portion insulating construction according to the present invention was applied to an automotive alternator stator, but in Embodiment 2, a coil portion insulating construction according to the present invention is applied to an automotive alternator rotor.

Figure 10A:
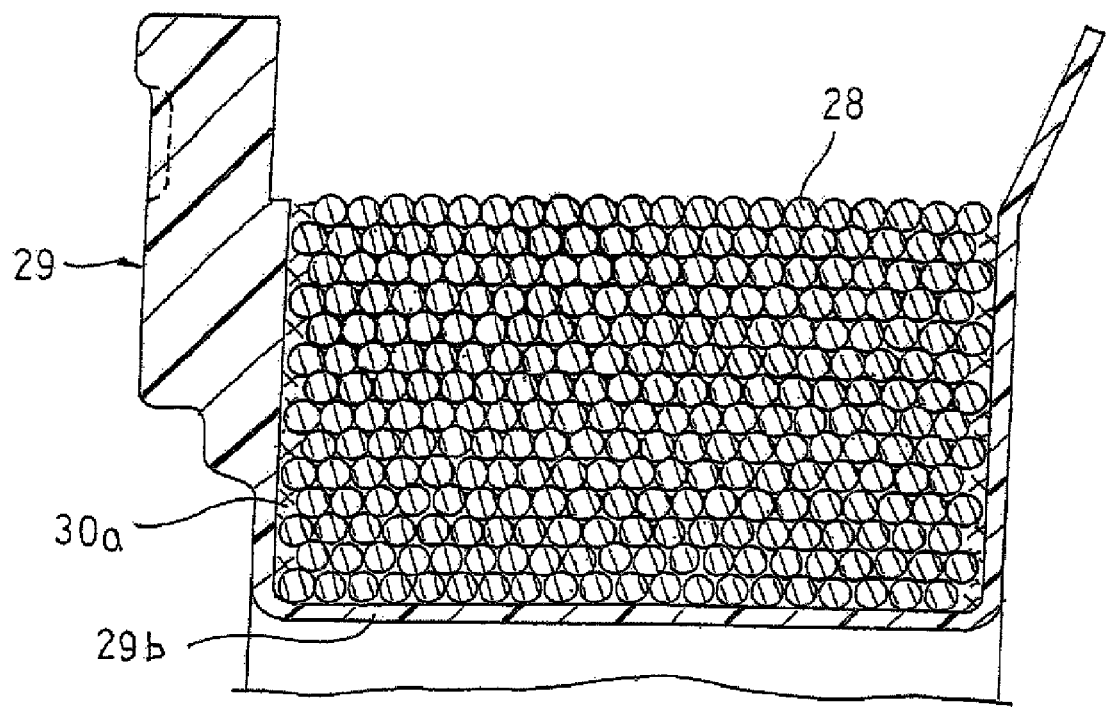
FIGS. 10A and 10B are diagrams that explain a configuration of a wound portion of a field coil of a rotor to which an insulating construction according to Embodiment 2 of the present invention has been applied.
Figure 10B:
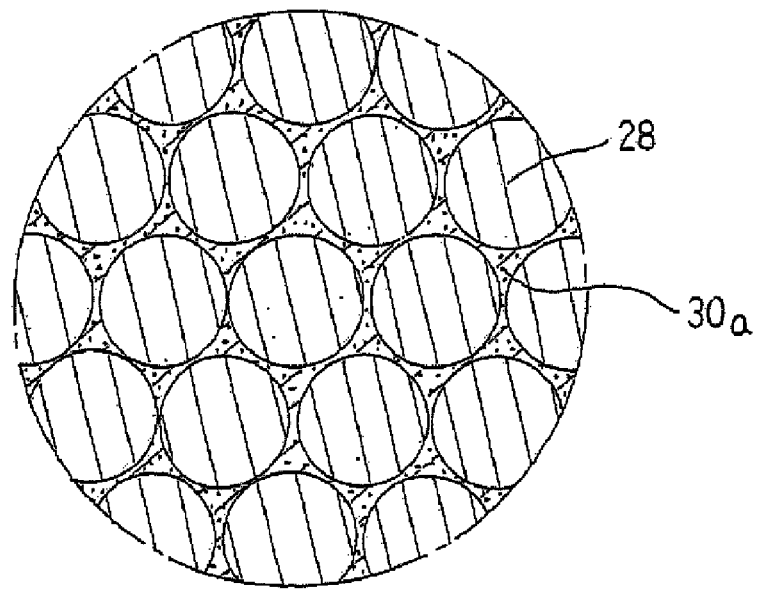
Figure 11:
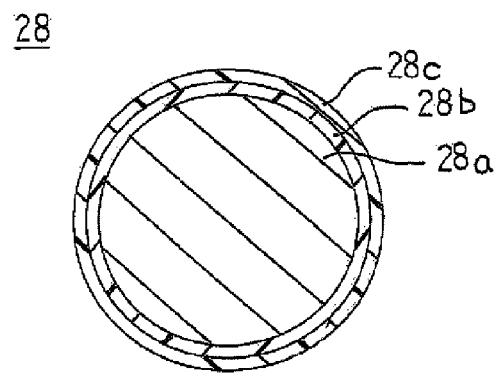
FIG. 11 is a cross section of the field coil of the rotor to which the insulating construction according to Embodiment 2 of the present invention has been applied.
Figure 12:
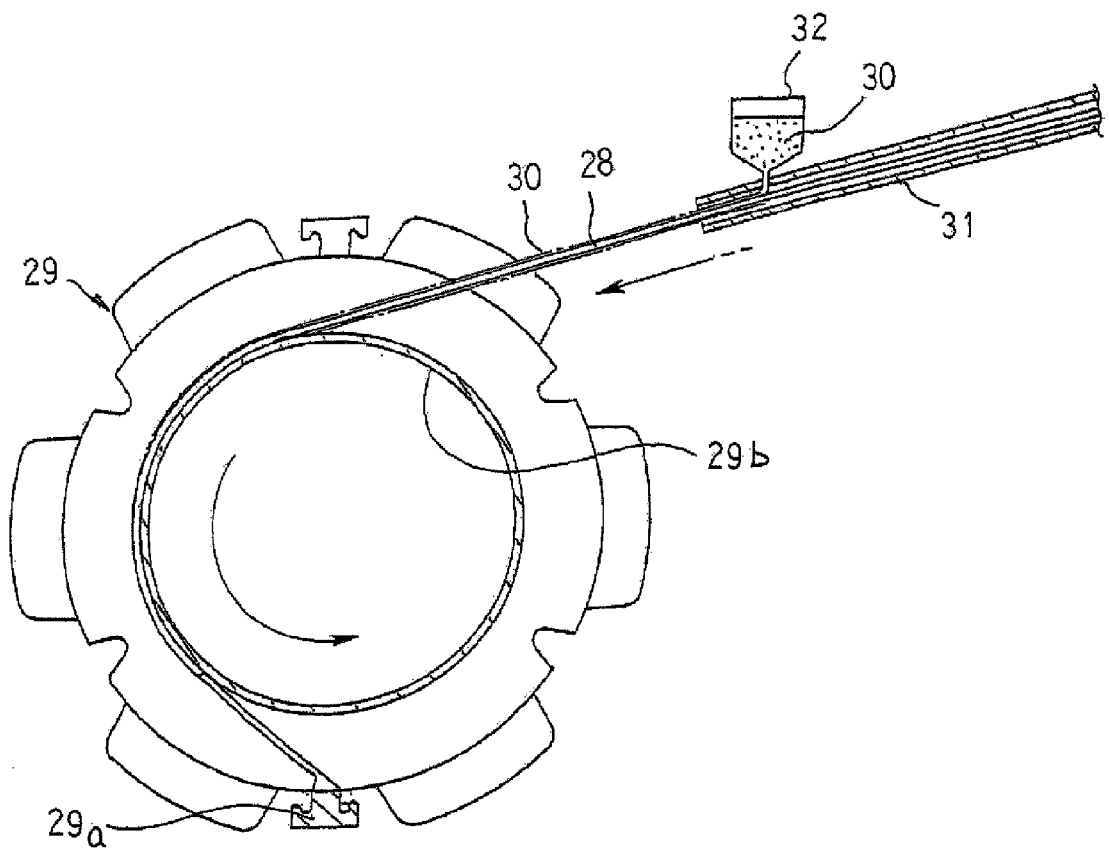
FIG. 12 is a diagram that explains a step of applying an insulating resin in Embodiment 2 of the present invention.
Figure 13:
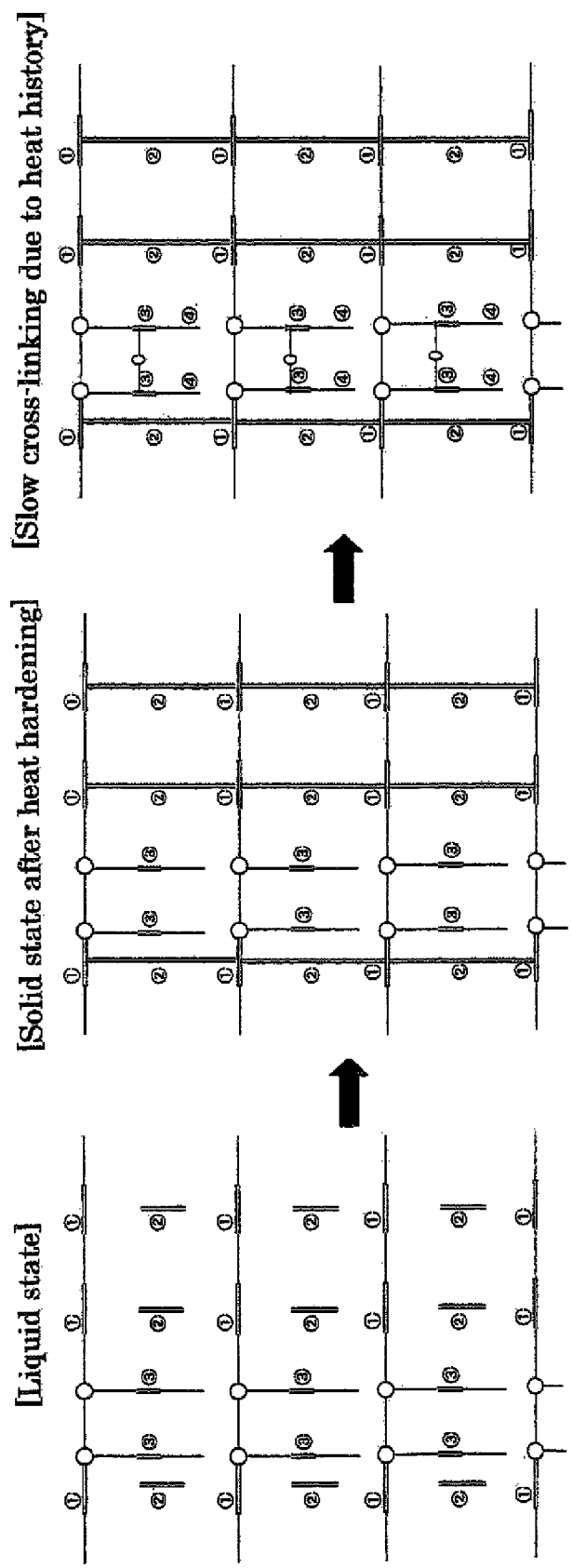
FIGS. 13A through 13C are diagrams that explain a thermal degrading action of the insulating resin that can be used in the insulating construction according to Embodiment 2 of the present invention.

FIGS. 10A and 10B are diagrams that explain a configuration of a wound portion of a field coil of a rotor to which an insulating construction according to Embodiment 2 of the present invention has been applied, FIG. 10A being a cross section thereof and FIG. 10B being a partial cross section thereof. FIG. 11 is a cross section of the field coil of the rotor to which the insulating construction according to Embodiment 2 of the present invention has been applied, FIG. 12 is a diagram that explains a step of applying an insulating resin in Embodiment 2 of the present invention, and FIGS. 13A through 13C are diagrams that explain a thermal degrading action of the insulating resin that can be used in the insulating construction according to Embodiment 2 of the present invention, FIG. 13A representing a liquid state of the insulating resin, FIG. 13B representing a solid state after heat hardening of the insulating resin, and FIG. 13C representing a loosely cross-linked state that results from heat history after the heat hardening of the insulating resin.

As shown in FIGS. 10A and 10B, in an automotive alternator rotor, a field coil 28 that has a diameter of 9 mm is wound onto a bobbin 29 that is made of a nylon in fourteen layers at twenty turns per layer for a total of 280 turns. An insulating resin 30 is impregnated into the wound portion of the field coil 28 and hardened. Thus, the field coil 28 is fixed firmly to itself and to the bobbin 29 by a hardened body 30a of the insulating resin 30. The rotor is configured by installing on a pole core the bobbin 29 onto which the field coil 28 has been wound.

As shown in FIG. 11, the field coil 28 is constituted by an enameled wire that is constituted by: a copper wire 28a that functions as a conductor that has a diameter of 9 mm; a polyesterimide resin layer 28b that is applied externally around the copper wire 28a to a thickness of approximately 14 μm and hardened; and a polyamideimide resin layer 28c that is applied externally around the polyesterimide resin layer 28b to a thickness of approximately 6 μm and hardened. An enamel coating is configured into a two-layer construction in which the polyesterimide resin layer 28b constitutes a lower layer, and the polyamideimide resin layer 28c constitutes an upper layer.

To allow for long-term thermal load in the automotive alternator and centrifugal force due to rotation of the rotor, a design has been adopted that aims for high thermal degradation resistance and strong adhesive force by using an insulating resin 30 that includes an oil component in a THEIC-modified polyester resin (a base resin) that has high heat resistance. The adhesive force of the hardened body 30a of the insulating resin 30 in particular has been increased by reducing modification by the oil component.

The insulating resin 30 uses oleic acid that includes one double bond as the oil component, and is a compound that has a base resin in which a THEIC-modified polyester resin has been modified 20 percent by the oleic acid, to which HEMA that functions as a reactive diluent has been added and dissolved such that the base resin solid component is 40 to 50 weight percent, and to which 0.04 weight percent of a polymerization inhibitor (hydroquinone), 0.1 weight percent of a desiccant (cobalt naphthenate), and 1.3 weight percent of a peroxide (1,1-di-(tert-butylperoxy)cyclohexane) have been added.

As shown in FIG. 12, the field coil 28, of which a leading end has been wound onto a securing portion 29a on the bobbin 29, is paid out through a winding nozzle 31 while being wound onto a drum portion 29b of the rotating bobbin 29 so as to have a predetermined tension. At this time, the insulating resin 30 is applied from a hopper 32 that is disposed on a tip end portion of the winding nozzle 31 to the field coil 28 that extends tangentially to the drum portion 29b. The insulating resin 30 is thereby filled uniformly between winds of the field coil 28 that are adjacent in an axial direction of the drum portion 29b and between winds of the field coil 28 that are adjacent in a radial direction without leaving gaps. Next, after the field coil 28 has been wound onto the bobbin 29 for a predetermined number of turns, the insulating resin 30 is hardened by heating it to 150 degrees Celsius for thirty minutes.

In Embodiment 2, the enamel coating of the field coil 28 is configured into a two-layer construction that includes: the polyesterimide resin layer 28b in the lower layer; and the polyamideimide resin layer 28c in the upper layer. The polyesterimide resin layer 28b in the lower layer can generally withstand temperatures that are greater than or equal to 200 degrees Celsius, and also has high mechanical strength and superior adhesiveness relative to the copper wire 28a. The polyamideimide resin layer 28c in the upper layer can generally withstand temperatures that are greater than or equal to 220 degrees Celsius, and has high mechanical strength and superior extensibility. Thus, in the step of winding the field coil 28, the field coil 28 is wound onto the drum portion 29b of the bobbin 29 at high speed while applying predetermined tension thereto, but the enamel coating withstands the shaping loads that act on the field coil 28, suppressing the occurrence of damage to the coating itself, and the occurrence of peeling of the enamel coating from the copper wire 28a is also suppressed by the strong adhesive force of the polyesterimide resin layer 28b in the lower layer.

Of all of the acids that are fatty acids that are derived from oils and that have unsaturated bonds, oleic acid, which has only one double bond, is used as the oil component. Thus, cross-linking due to the heat history that the automotive alternator is subjected to during use progresses and strength increases, but because there are few cross-links compared to linseed oil fatty acids, etc., that have two double bonds, more durable properties can be maintained since strength increases while maintaining ductility.

Next, the effects of modification of the THEIC-modified polyester resin that constitutes a major component of the insulating resin 30 by the oleic acid, in other words, improvement of degradation characteristics, will be explained with reference to FIGS. 13A through 13C.

In normal hardening processes of the insulating resin 30, only cross-linking due to radical polymerization of the double bonds of the unsaturated polyester resin and the double bonds of the reactive diluent occurs during hardening, as shown in FIG. 13A.

At this time, cross-linking of the double bonds in the fatty acids (a hardening reaction) has not occurred, and oleic acid that has bonded like pendants from the polymer chains is present in the hardened body 30a, as shown in FIG. 13B. The presence of the oleic acid imparts ductility to the hardened body 30a, alleviating stresses due to linear expansion differences between the hardened body 30a of the insulating resin 30 and the polyamideimide resin layer 28c in the upper layer.

In addition, as shown in FIG. 13C, loose cross-linking that results from oxygen polymerization of the double bond in the fatty oleic acid occurs due to the heat history that the automotive alternator is subjected to during use, gradually increasing the strength of the hardened body 30a of the insulating resin 30. Here, there are few cross-links compared with linseed oil fatty acids, etc., that have two double bonds, and strength increases while further maintaining ductility since the pendant-shaped portions remain. The strength continues rising until this loose cross-linking is completed, and during that time thermal degradation is prevented, enabling more durable properties to be maintained.

Because the polyesterimide resin layer 28b, which has strong adhesiveness with the copper wire 28a, is used in the lower layer of the enamel coating, it withstands mechanical loads that act on the field coil 28 when the field coil 28 is being wound onto the bobbin 29, suppressing the occurrence of peeling of the enamel coating from the copper wire 28a. Because the polyamideimide resin layer 28c, which has high extensibility, is used in the upper layer of the enamel coating, it withstands the mechanical loads that act on the field coil 28 when the field coil 28 is being wound onto the bobbin 29, the occurrence of damage is suppressed in the enamel coating, and high thermal degradation resistance can also be achieved.

Because the THEIC-modified polyester resin that constitutes a major component of the insulating resin 30 is modified by the oleic acid so as to cross-link more slowly, stresses that arise between the hardened body 30a of the insulating resin 30 and the enamel coating are further reduced. Compatibility between the insulating resin 30 and the enamel coating is thereby further improved, ensuring increased insulation.

Figure 14:
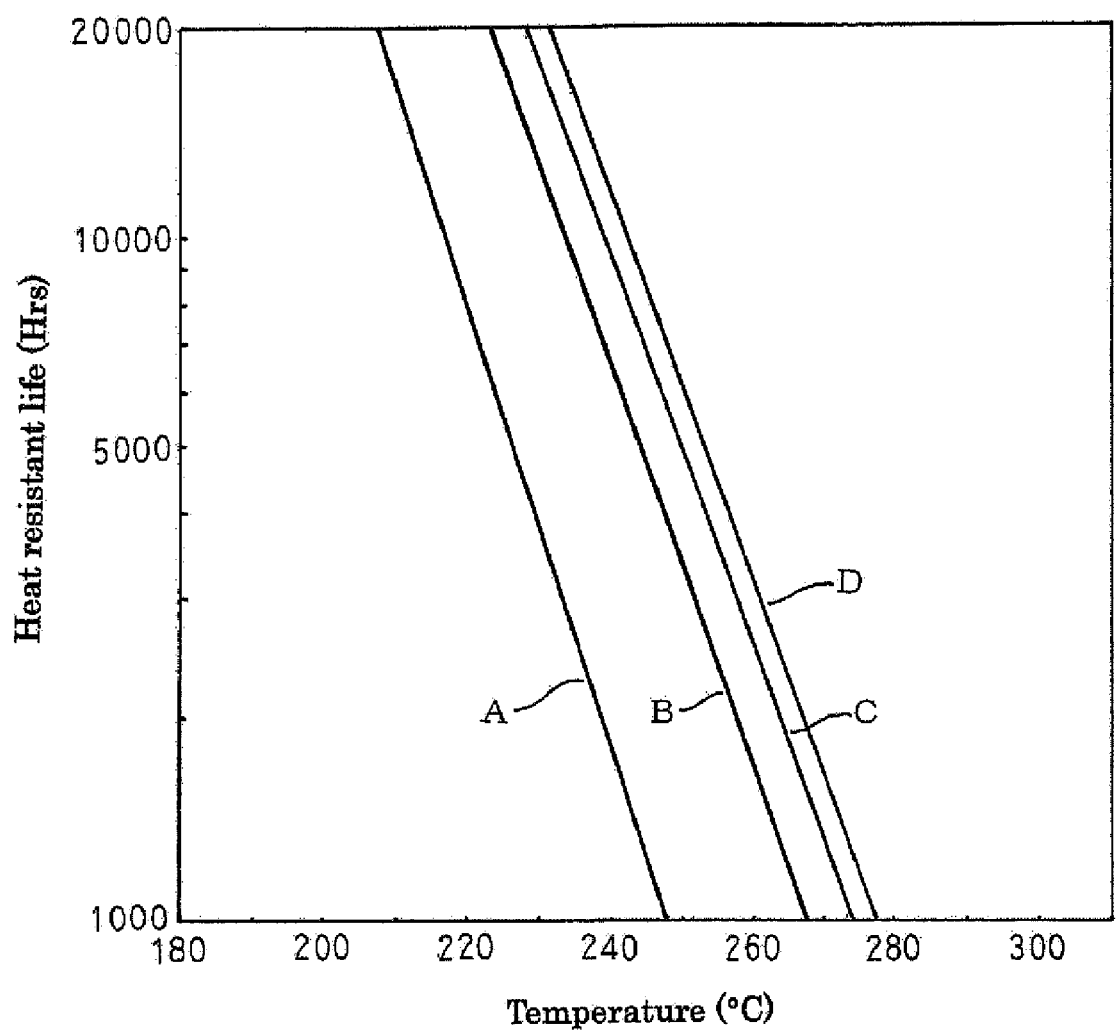
FIG. 14 is a graph that shows heat resistant life test results of enamel coatings in the field coil of the rotor to which the insulating construction according to Embodiment 2 of the present invention has been applied.

Now, enameled wires were prepared in which the percentage of the film thickness of the polyamideimide resin layer relative to the total thickness of the enamel coating was set to 10 percent, 20 percent, 30 percent, and 100 percent, and results when heat resistant life thereof was tested using American Society for Testing Materials Test Method D2307 are shown in FIG. 14. Moreover, the enamel coatings had a two-layer construction in which a polyesterimide resin layer constituted a lower layer, and a polyamideimide resin layer constituted an upper layer. The enamel coating in which the percentage of the film thickness of the polyamideimide resin layer relative to the total thickness of the enamel coating was 100 percent had a single-layered construction constituted by a polyamideimide resin layer. Moreover, lines A through D in FIG. 14 represent the heat resistant life of field coils in which the percentage of the film thickness of the polyamideimide resin layer relative to the total thickness of the enamel coating was 10 percent, 20 percent, 30 percent, and 100 percent, respectively.

From FIG. 14, it can be seen that sufficient heat resistance is achieved if the film thickness of the polyamideimide resin layer is greater than or equal to 30 percent of the total thickness. It can also be seen that heat resistant life (thermal degradation resistance) does not improve noticeably when the film thickness of the polyamideimide resin layer is increased beyond 30 percent of the total thickness. It can be inferred from this that the service life of the polyamideimide resin layer in the upper layer is improved when the film thickness of the polyamideimide resin layer is increased, but that the service life improving effects of the polyamideimide resin layer are canceled out because the polyesterimide resin layer in the lower layer that is placed in close contact with the copper wire becomes thinner, reducing the adhesiveness between the copper wire and the polyesterimide resin layer. Since polyamideimide resin is very expensive, it is also preferable for the percentage of the film thickness of the polyamideimide resin layer relative to the total thickness to be set to 30 percent for cost reasons.

Thus, it is preferable that the film thickness of the polyamideimide resin layer 28c be set to greater than or equal to 30 percent of the total thickness of the enamel coating in this field coil 28 since sufficient heat resistance, mechanical strength, and thermal degradation resistance can be achieved by setting the film thickness of the polyamideimide resin layer 28c to greater than or equal to 30 percent of the total thickness of the enamel coating. It is more preferable to set the film thickness of the polyamideimide resin layer 28c to 30 percent of the total thickness of the enamel coating for cost reasons. By combining this field coil 28 and the insulating resin 30, improved film strength and strong initial adhesive forces can be achieved that can withstand winding processes, and increased adhesive forces and insulation can also be maintained over a long period.

Because the THEIC-modified polyester resin is modified 20 percent by the oleic acid, the maximum strength is lower than when the modification by the oleic acid is 25 percent or 35 percent, as shown in FIGS. 7 and 8. However, in Embodiment 2, this configuration was adopted in order to increase the initial adhesive force to allow for the insulating construction of the present invention to be applied to rotors. In other words, if the adhesive force of the hardened body 30a of the insulating resin 30 is initially low, there is a risk that problems may arise such as the hardened body 30a breaking and damaging the field coil 28 due to the large centrifugal forces that act on the rotor, etc. By adopting this configuration, the adhesive force of the hardened body 30a of the insulating resin 30 is greater initially, enabling the occurrence of damage to the field coil 28 that results from the centrifugal forces that act on the rotor to be prevented.

In Embodiment 2, because HEMA, which is an acrylic monomer, is also used for the reactive diluent, good environmental characteristics can be obtained, and good compatibility is also maintained between the field coil 28 and the insulating resin 30, maintaining increased insulation, and ensuring high thermal degradation resistance and strong initial adhesive force.

It is necessary for automotive alternators to endure use for long periods such as 15 years, 150,000 km, etc., for example, and coil portion insulating constructions in rotors that can be used therein are required not only to have strong initial adhesive forces but also to maintain strong adhesive forces over long periods. The coil portion insulating construction according to Embodiment 2 can achieve strong initial adhesive forces and maintain strong adhesive forces and superior thermal degradation resistance over long periods, making it eminently suitable for coil portion insulating constructions in automotive alternator rotors.

Moreover, in Embodiment 2 above, oleic acid, which includes one double bond, is used as a fatty acid, but the number of double bonds that are included in the fatty acid is not limited to one. In other words, fatty acids that include a plurality of double bonds can also be used as the oil component of the present invention because they also maintain ductility until the double bonds cross-link completely. Because strength increases while maintaining ductility if the number of double bonds is one, it is desirable to use a fatty acid that includes one double bond as the oil component.

The fatty acid is not limited to oleic acid. For example, fatty acids that have one double bond such as myristoleic acid, palmitoleic acid, elaidic acid, vaccenic acid, gadoleic acid, erucic acid, nervonic acid, etc., fatty acids that include two double bonds such as linoleic acid, etc., and fatty acids that include three double bonds such as Q-linolenic acid, etc., can be used.

Embodiment 3

Figure 15:
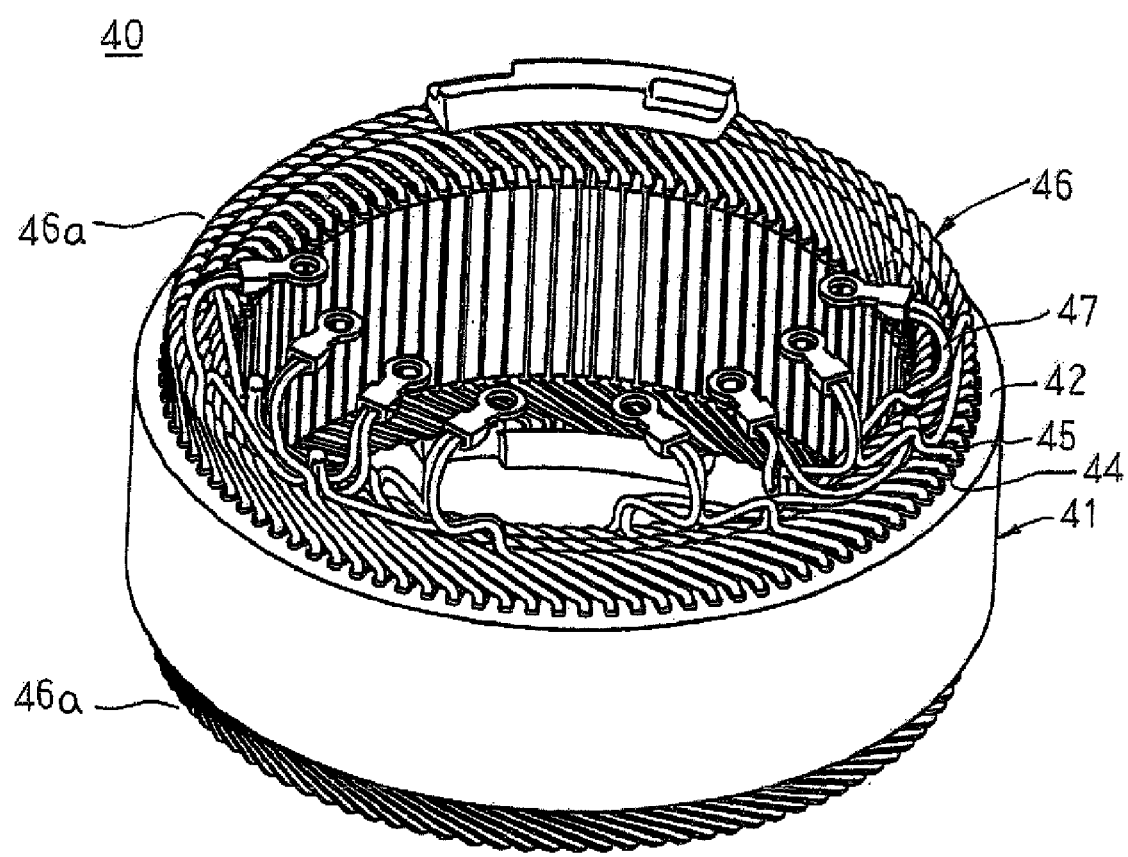
FIG. 15 is a perspective of a stator to which an insulating construction according to Embodiment 3 of the present invention has been applied.
Figure 16:
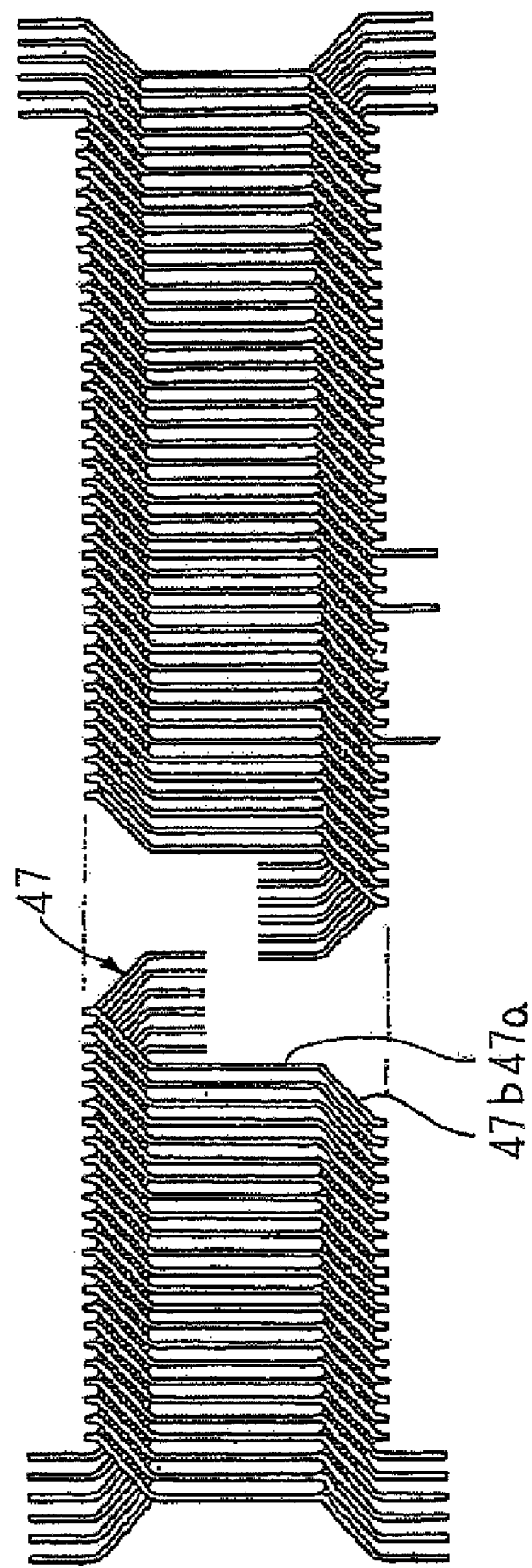
FIG. 16 is a plan of a winding assembly that constitutes a stator winding of the stator that is shown in FIG. 16.
Figure 17A:
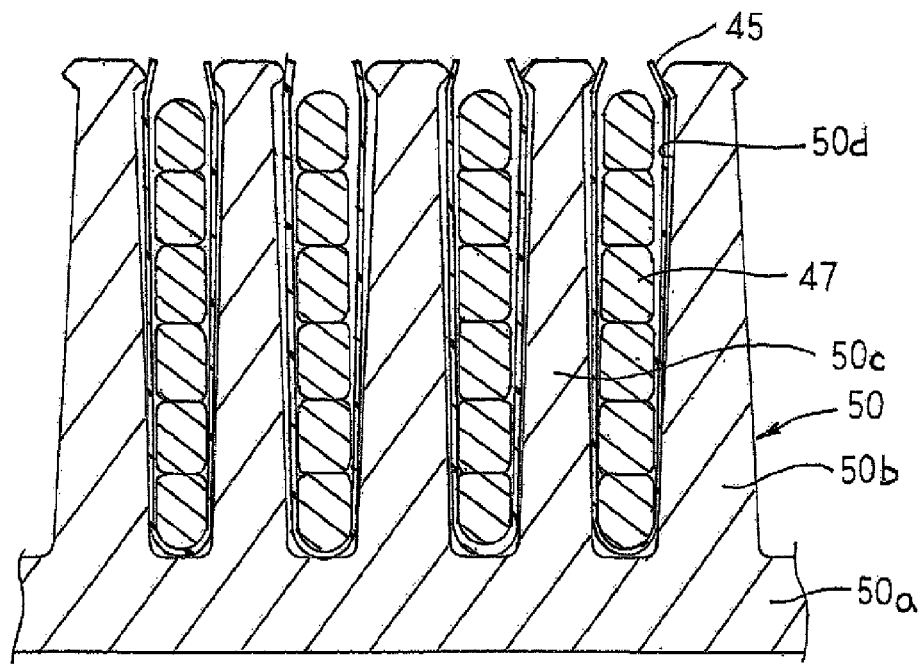
FIGS. 17A and 17B are diagrams that explain a method for manufacturing the stator that is shown in FIG. 15.
Figure 17B:
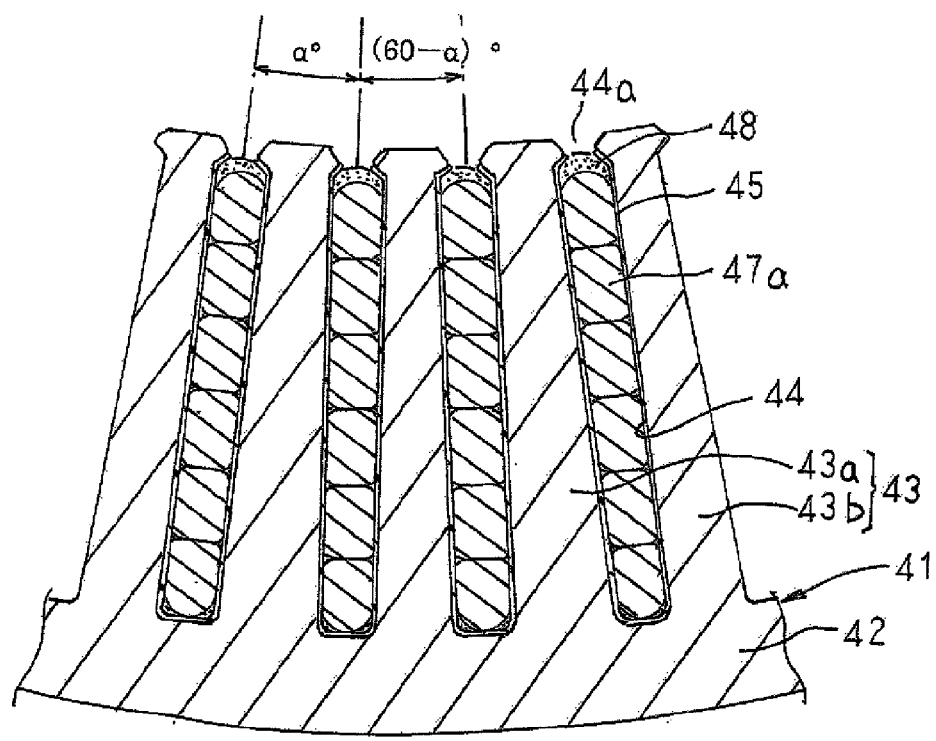

FIG. 15 is a perspective of a stator to which an insulating construction according to Embodiment 3 of the present invention has been applied, FIG. 16 is a plan of a winding assembly that constitutes a stator winding of the stator that is shown in FIG. 15, and FIGS. 17A and 17B are diagrams that explain a method for manufacturing the stator that is shown in FIG. 15.

In FIGS. 15 through 17B, a stator 40 includes: a stator core 41; and a stator winding 46 that is installed in the stator core 41.

The stator core 41 includes: an annular core back portion 42; a plurality of tooth portions 43 that are disposed so as to extend radially inward from the core back portion 42; and a plurality of slot portions 44 that are defined by the core back portion 42 and the tooth portions 43. The tooth portions 43 are constituted by tooth portions 43a that have a large circumferential width and narrow tooth portions 43b. The tooth portions 43a and 43b are disposed alternately such that an electrical angle between center lines of slot opening portions 44a of adjacent slot portions 44 (lines that connect circumferential centers and a central axis) alternates between α° and (60−α)°. The slot portions 44 are prepared at a ratio of two slots per phase per pole at a nonuniform pitch. Insulating paper 45 is mounted so as to cover inner surfaces of the slot portions 44.

The stator winding 46 includes six phase windings that are installed in every sixth slot portion 44, and is constituted by: a first alternating-current winding in which three phase windings that are installed so as to have a phase difference of 120 electrical degrees are formed into an alternating-current connection; and a second alternating-current winding in which three remaining phase windings that are installed so as to have a phase difference of 120 electrical degrees are formed into an alternating-current connection. Here, the first alternating-current winding and the second alternating-current winding have a phase difference of a electrical degrees. Each of the phase windings is constituted by two 3-turn windings that are connected in parallel.

Although not shown, the stator coils 47 are constituted by enameled wires that are constituted by: a copper wire that functions as a conductor that has a diameter of 1.5 mm; a polyesterimide resin layer that is applied externally around the copper wire to a thickness of approximately 20 μm and hardened; and a polyamideimide resin layer that is applied externally around the polyesterimide resin layer to a thickness of approximately 15 μm and hardened. An enamel coating is configured into a two-layer construction in which the polyesterimide resin layer constitutes a lower layer, and the polyamideimide resin layer an upper layer. Slot-housed portions 47a of the stator coils 47 are deformed so as to have an approximately rectangular cross section before being mounted into the stator core 41.

Six slot-housed portions 47a of the stator coils 47 that have rectangular cross sections are housed in each of the slot portions 44 so as to be placed in close contact with each other and so as to line up in single rows in a radial direction. The stator coils 47 can thereby be housed inside the slot portions 44 so as to have a high space factor. Return portions 47b that link the slot-housed portions 47a of the stator coils 47 to each other (corresponding to coil ends) extend outward at two axial ends of the stator core 41 so as to constitute coil end groups 46a of the stator winding 46. An insulating resin that is described below is impregnated into the slot portions 44 and hardened, and also applied to the two coil end groups 46a, impregnated, and hardened.

Here, stresses when forming the rectangular cross section, and bending stresses in a step for preparing the stator core 41 as described below act on the stator coils 47. Thus, in order to ensure strong adhesive force between the enamel coating and the copper wire, and because higher mechanical strength and extensibility are required in the outermost layers, the polyesterimide resin layer, which has high bonding strength with the copper wire, is formed in the lowest layer, and the polyamideimide resin layer, which has higher mechanical strength and extensibility, is formed in the outermost layer, and in addition, the thickness of the polyamideimide resin layer is increased to approximately 43 percent of the total thickness of the enamel coating.

The insulating resin is a compound that has a base resin in which a THEIC-modified polyester resin has been modified 25 percent by oleic acid, to which HEMA that functions as a reactive diluent has been added and dissolved such that the base resin solid component is 40 to 50 weight percent, and to which 0.04 weight percent of a polymerization inhibitor (hydroquinone), 0.1 weight percent of a desiccant (cobalt naphthenate), and 1.3 weight percent of a peroxide (1,1-di-(tert-butylperoxy) cyclohexane) have been added.

Next, a method for manufacturing the stator 40 will be explained.

First, a rectangular parallelepiped laminated core 50 is prepared by laminating a predetermined number of thin strip-shaped magnetic plates that have been punched from a rolled steel plate. In this laminated core 50 are formed: a core back portion 50a; broad-width tooth portions 50b and narrow-width tooth portions 50c; and slot portions 50d that are defined by the core back portion 60a and the tooth portions 50b and 50c.

Next, a winding assembly 51 that is shown in FIG. 16 is prepared by bending and forming twelve stator coils 47 simultaneously into a lightning shape on a common plane, and then folding them at right angles using a jig. Moreover, slot-housed portions 47a of the respective stator coils 47 that are linked by return portions 47b are bent and formed into planar patterns that are arranged at a pitch of six slots (6P). Adjacent slot-housed portions 47a are offset by the return portions 47b by a width of the stator coils 47. The winding assembly 51 is configured such that six coil pairs in which two stator coils 47 that are formed in such a pattern are arranged so as to be offset by a pitch of six slots with their slot-housed portions 47a superposed are arranged so as to be offset by a pitch of one slot. Six end portions of the stator coils 47 extend outward on each of two sides at two ends of the winding assembly 51. The return portions 47b are arranged so as to be arrayed neatly on two side portions of the winding assembly 51.

Slot-housed portions 47a of winding assemblies 51 that have been configured in this manner are deformed by press-forming so as to have rectangular cross-sections.

Next, as shown in FIG. 17A, three layers of winding assemblies 51 are stacked and mounted into the laminated core 50 in which the insulating paper 45 has been mounted into the slot portions 50d. Here, six slot-housed portions 47a are housed inside each of the slot portions 50d so as to line up in single columns.

Next, only two end portions of the laminated core 50 are bent so as to have a curvature that is equal to the radius of curvature of the stator core 41, and then the whole of the laminated core 50 is bent into a cylindrical shape such that openings of the slot portions 50d face inward.

Then, two end surfaces of the laminated core 50 that has been bent into the cylindrical shape are abutted and integrated by welding using laser welding, for example, to obtain the cylindrical stator core 41 that is shown in FIG. 17B.

Next, the six phase windings are prepared by connecting the end portions of the stator coils 47 to each other.

As shown in FIG. 5, the stator core 41 is held in a holding jig 18 and is rotated around a central axis while the insulating resin is applied from a nozzle 19 from radially outside the stator 40 and impregnated into the coil end groups 46a of the stator winding 46 then hardened by heating it to 150 degrees Celsius for thirty minutes. The insulating resin is thereby impregnated into and hardened in the coil end groups 46a, and the large number of coil ends (the return portions 47b) that constitute the coil end groups 46a are fixed integrally by a hardened body 48 of the insulating resin. Similarly, the insulating resin that has been applied to the coil end groups 46a passes over the coil ends and is impregnated into the slot portions 44 and hardened, and the slot-housed portions 47a of the stator coils 47 are fixed to the slot portions 44 by the hardened body 48 of the insulating resin. Rigidity of the stator 40 is thereby increased, suppressing the occurrence of electromagnetic noise, and vibration resistance of the stator winding 46 is also increased, suppressing deterioration of insulation that results from abrasion of the stator coils 47.

In Embodiment 3, because the slot-housed portions 47a of the stator coils 47 are housed inside the slot portions 44 so as to be arranged in single columns radially so as to contact each other closely over their entire lengths in a longitudinal direction, adjacent slot-housed portions 47a are in close proximity with each other, and the slot-housed portions 47a and the insulating paper 45 are in close proximity. Thus, the insulating resin penetrates easily due to capillary action at these portions that are in close proximity, and the slot portions 44 can be filled with the insulating resin without leaving gaps even if the modification of the THEIC-modified polyester resin that constitutes a major component of the insulating resin by the oil component is reduced. Thus, the initial adhesive force of the hardened body 48 of the insulating resin can be increased by reducing the modification of the THEIC-modified polyester resin by the oleic acid to 25 percent.

In this winding construction, the slot-housed portions 47a of the stator coils 47 are in line contact or surface contact with each other, generating large stresses. In addition, because the slot-housed portions 47a of the stator coils 47 are deformed so as to have rectangular cross-sections, and the laminated core 50 into which the winding assemblies 51 have been mounted is bent into a cylindrical shape, high mechanical strength and extensibility are required in the outermost layers of the stator coils 47. In Embodiment 3, by combining this insulating resin and stator coils 47 in which the thickness of the polyamideimide resin layer in the outermost layers has been increased to approximately 43 percent of the total thickness of the enamel coating, high strength and strong initial adhesive forces that can withstand the process of manufacturing the winding assemblies 51 and the process of bending the laminated core 50, etc., can be achieved, and strong adhesive forces and increased insulation can also be maintained over a long period.

Moreover, in Embodiment 1 above, enameled wires that have a single-layered coat that is constituted by a polyamideimide resin layer are used, and in Embodiments 2 and 3, enameled wires that have a two-layered coat that is constituted by a polyesterimide resin layer and a polyamideimide resin layer are used, but the enameled wires that can be used in the present invention are not limited to these provided that a polyamideimide resin layer is the outermost layer.

The polyamideimide resin layer in the outermost layer of the enamel coating need simply be a composition that has polyamideimide as a major component, and if ease of winding is required, for example, small amounts of additives that add lubrication such as polyethylene, etc., may also be included. It is preferable for the enamel coating to be designed with polyamideimide as a major component depending on the characteristics and quality that are required while allowing for affinity with the present insulating resin.

Enameled wires are sometimes wound onto large winding members when they are shipped, and in such cases paraffin, etc., may be applied in order to prevent the occurrence of scratching of the enamel coating, and to improve housing efficiency of the enameled wires on the winding members. In such cases, the paraffin does not constitute a layer of the enamel coating, and does not correspond to the outermost layer of the enamel coating of the present invention.

In each of the above embodiments, cases in which slots are formed at a ratio of two slots per phase per pole have been explained, but the number of slots is not limited to that ratio. Cases in which slot portions are arranged at a nonuniform pitch have also been explained, but the slot portions are not limited to this arrangement, and may also be arranged at a uniform angular pitch, for example.

In each of the above embodiments, cases in which the present invention was applied to automotive alternator rotors and stators have been explained, but the present invention may also be applied to automotive electric motors, or automotive electric motor-generators, etc. For example, because automotive starter motor rotors operate only during starting of a vehicle and are not operating constantly, it is desirable to use an insulating resin therein that is set so as to obtain strong adhesive forces. In that case, it is desirable to suppress the oil component in the insulating resin to approximately 20 weight percent.

Although electric motor rotors for electric power steering, unlike alternators, do not operate constantly, since they operate whenever a user steers, it is necessary not only to achieve adhesive force, but also to make thermal degradation less likely. Thus, it is desirable to suppress the oil component in the insulating resin to approximately 25 weight percent.

If applied to automotive electric motor-generator rotors or stators, the insulating resin must be designed so as to increase adhesive force while maintaining thermal degradation resistance for generating functions. Increased reliability is required particularly in automotive electric motor-generators that will be used in drive systems of hybrid vehicles, or electric vehicles, etc., since they affect the operation of the vehicle directly.

What is claimed is:

1. A dynamoelectric coil portion insulating construction for a dynamoelectric machine in which a coil portion that is formed by winding a coil onto a core is impregnated with an insulating resin, wherein:
   said coil is an enameled wire that is covered by an enamel coating in which an uppermost layer is a polyamideimide resin layer; and
   said insulating resin is a THEIC-modified polyester resin that has been modified by an oil component.

2. A dynamoelectric coil portion insulating construction according to claim 1, wherein said oil component is a fatty acid that has an unsaturated bond.

3. A dynamoelectric coil portion insulating construction according to claim 1, wherein said oil component is oleic acid.

4. A dynamoelectric coil portion insulating construction according to claim 1, wherein modification of said THEIC-modified polyester resin by said oil component is greater than or equal to 20 percent and less than 40 percent.

5. A dynamoelectric coil portion insulating construction according to claim 1, wherein an acrylic monomer is added to said insulating resin.

6. A dynamoelectric coil portion insulating construction according to claim 1, wherein said enamel coating includes a polyesterimide resin layer in a lower layer.

7. A dynamoelectric coil portion insulating construction according to claim 6, wherein said enamel coating is configured so as to have a two-layer construction that includes said polyamideimide resin layer and said polyesterimide resin layer.

8. A dynamoelectric coil portion insulating construction according to claim 6, wherein said polyamideimide resin layer is formed so as to have a thickness that is greater than or equal to 30 percent of a total thickness of said enamel coating.

9. A dynamoelectric coil portion insulating construction according to claim 1, wherein said coil is a stator coil, and said core is a stator core.

10. A dynamoelectric coil portion insulating construction according to claim 9, wherein said dynamoelectric machine is an automotive alternator.

11. A dynamoelectric coil portion insulating construction according to claim 1, wherein said coil is a field coil, and said core is a rotor core.

12. A dynamoelectric coil portion insulating construction according to claim 11, wherein said dynamoelectric machine is an automotive alternator.

* * * * *